(No Model.)

B. HOLLAND, Jr.
SINK TRAP.

No. 303,640. Patented Aug. 19, 1884.

WITNESSES,

INVENTOR,
Benjamin Holland Jr.
By N. C. Lombard
Attorney

United States Patent Office.

BENJAMIN HOLLAND, JR., OF PROVIDENCE, RHODE ISLAND.

SINK-TRAP.

SPECIFICATION forming part of Letters Patent No. 303,640, dated August 19, 1884.

Application filed March 10, 1884. (No model.)

*To all whom it may concern:*

Be it known that I, BENJAMIN HOLLAND, Jr., of Providence, in the county of Providence and State of Rhode Island, have invented a new and useful Improvement in Sink-Traps, of which the following, taken in connection with the accompanying drawings, is a specification.

My invention relates to the construction of traps for sinks and other like purposes, and particularly to that class of traps in which the sink discharge-pipe opens into a cylindrical chamber some distance below the discharge-pipe leading from said chamber to the drain, and has for its object a more perfect and durable sealing of the pipe against the passage upward through said pipe of foul odors by a material reduction in the liability to siphon the liquid out of the trap; and it consists in a novel construction of the pendent pipe within the cylindrical chamber and inclosing the lower end of said pipe, or partially inclosing it by partitions, as will be best understood by reference to the description of the drawings, and to the claims to be hereinafter given.

Figure 1:
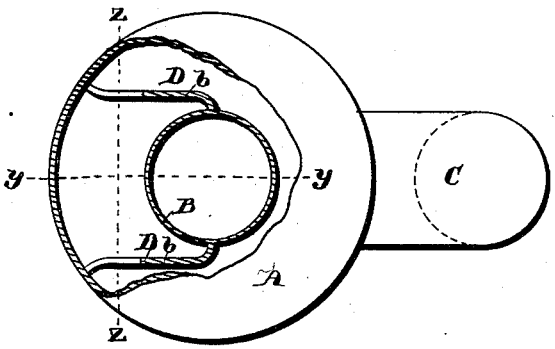
Figure 3:
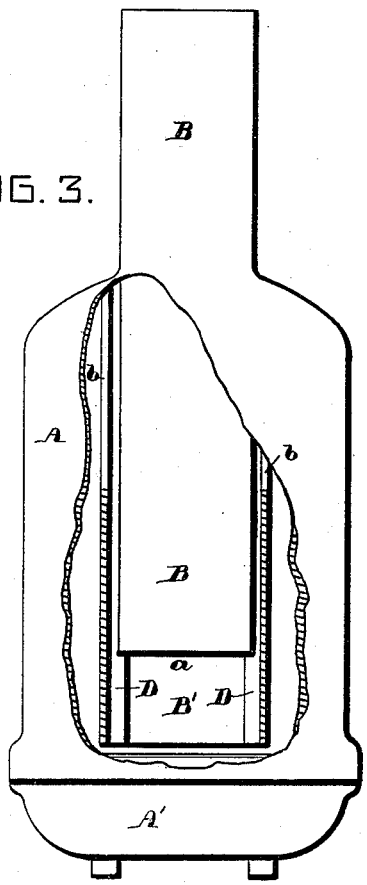
Figure 2:
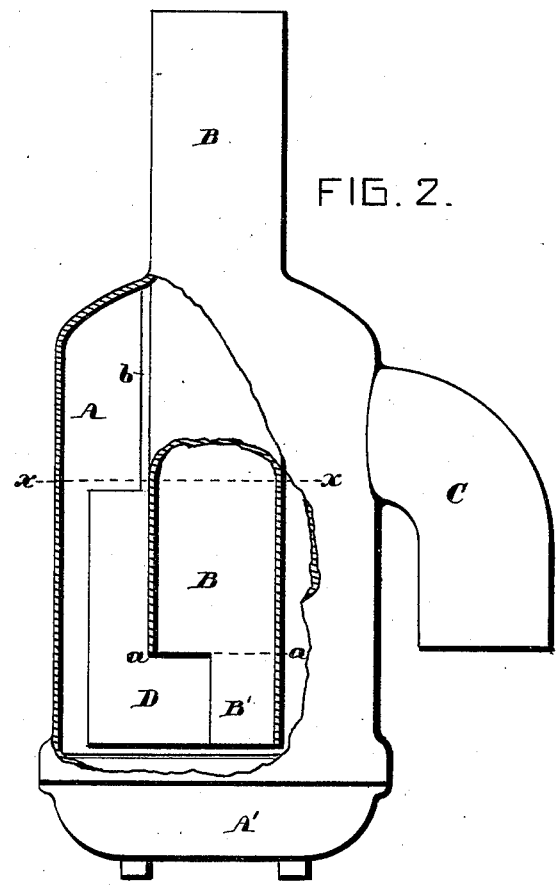

Figure 1 is a sectional plan of a trap embodying my invention, the cutting-plane being on line $x\ x$ on Fig. 2. Fig. 2 is a sectional elevation of the same, the cutting-plane being on line $y\ y$ on Fig. 1; and Fig. 3 is a sectional elevation, the cutting-plane being on line $z\ z$ on Fig. 1, and looking toward the discharge-pipe of the trap.

A is the main body of the trap, made in the form of a cylindrical chamber, from the center of the upper end of which rises the waste-pipe B, which may be connected to the waste-pipe of a sink or other receptacle; and C is the discharge-pipe of the trap, which is connected in the usual manner to the other part of the sink waste-pipe leading to the drain or sewer. The lower end of the cylinder A is closed by the head A', which is screwed into the cylinder in a well-known manner. The pipe B extends through the upper end of the cylinder A, and depends therefrom into the chamber of said cylinder in a well-known manner. Thus far there is nothing new in the trap, as traps have been made and used constructed precisely as above described, with the pipe projecting into the chamber A to the point $a\ a$, with its end cut square off, as indicated by the dotted line $a\ a$. I extend about one-half of the diameter of the pipe B on that side toward the discharge-pipe C some distance lower into the chamber A, as shown at B', and then secured to said pipe upon each side a partition, D, the lower edge of which was on a line with the end of the extended portion B' of the pipe B, and extended upward to or above the lowest part of the mouth of the discharge-pipe C, and having its vertical edges secured one to the pipe B and the other to the wall of the chamber A, as shown in Fig. 1. In some cases I extend about one-half (more or less) of the width of each of the partitions D, and that half next to the pipe B upward to the top of the chamber A, as shown at $b\ b$ in Figs. 2 and 3.

The operation of my invention is as follows: If an extra suction is created from any cause upon the pipe C, tending to draw air through the trap, the air descending the pipe B escapes beneath the shortest side of said pipe into the space between the partitions D, and rises through the water to the upper part of the chamber A and between said partitions D, thus confining the bulk of the agitation of the water contained in the chamber A to that water farthest from part of the surface of the mouth of the pipe C, and upon the opposite side therefrom of the pipe B, the result of which is that the amount of water carried over into the pipe C is very materially reduced, and the tendency to siphon is correspondingly diminished.

In the operation of my invention the agitation of the surface of the sealing-liquid in the chamber A is almost exclusively confined to that part between the partitions D D and between the pipe B and that portion of the wall of the chamber A inclosed by the partitions D D, and hence the reduced liability of carrying the liquid over into the pipe C.

What I claim as new, and desire to secure by Letters Patent of the United States, is—

1. In a sink-trap provided with the chamber A, the pendent pipe B, and the discharge-pipe C, the partitions D D, extending from said pipe B to the walls of the chamber A, and from the lower end of the pipe B to or above the lowest side of the mouth of the pipe C, and an opening in the side of the pendent portion of the pipe B for the escape therefrom of air above the lower edges of and between the partitions D D, substantially as and for the purposes described.

2. The combination of the chamber A, the discharge-pipe C, the pendent pipe B, having a portion of its circumference made shorter at its lower end than the other portion, and the partitions D D, connecting said pipe B with the wall of the chamber A, and extending downward to the end of the longest part of said pipe B, and inclosing the cut-away or shortened side of said pipe, substantially as described.

In testimony whereof I have signed my name to this specification, in the presence of two subscribing witnesses, on this 7th day of March, A. D. 1884.

BENJAMIN HOLLAND, JR.

Witnesses:
N. C. LOMBARD,
WALTER E. LOMBARD.